US00RE35477E

United States Patent [19]

Hussinger et al.

[11] E Patent Number: Re. 35,477

[45] Reissued Date of Patent: Mar. 18, 1997

[54] THIN FILM HEAD SLIDER FABRICATION PROCESS

[75] Inventors: Keith R. Hussinger, Westboro; Michael L. Mallary, Berlin, both of Mass.

[73] Assignee: Quantum Corporation, Milpitas, Calif.

[21] Appl. No.: 346,821

[22] Filed: Nov. 16, 1994

Related U.S. Patent Documents

[63] Continuation of Ser. No. 56,515, May 3, 1993, abandoned.

Reissue of:

[64] Patent No.: 5,095,613
Issued: Mar. 17, 1992
Appl. No.: 546,176
Filed: Jun. 29, 1990

[51] Int. Cl.[6] ..... G11B 5/42

[52] U.S. Cl. ..... 29/603.07; 29/423; 29/559

[58] Field of Search ..... 29/603, 423, 424, 29/559

[56] References Cited

U.S. PATENT DOCUMENTS

| | | | |
|---|---|---|---|
| 4,759,118 | 7/1988 | Nakashima | 29/603 |
| 4,914,868 | 4/1990 | Church et al. | 29/603 X |
| 4,939,837 | 7/1990 | Krounbi | 29/603 |

FOREIGN PATENT DOCUMENTS

| | | |
|---|---|---|
| 0137051A1 | 8/1983 | European Pat. Off. . |
| 3727054A1 | 8/1987 | Germany . |
| 58-194164 | 11/1983 | Japan . |
| 60-22724 | 2/1985 | Japan . |
| 2-134711 | 5/1990 | Japan . |
| 2150317 | 9/1984 | United Kingdom . |

*Primary Examiner*—Carl E. Hall
*Attorney, Agent, or Firm*—David B. Harrison

[57] ABSTRACT

In an improved process for fabricating thin film head sliders from a wafer on one face of which a plurality of electromagnetic devices are arranged in rows, a single-row bar is mechanically processed to form sliders while it remains an integral part of the wafer, or after it is bonded to a fixture under a condition which induces no bow on the bar. Alternatively, a double-row bar sliced from the wafer is used for fabrication of sliders, wherein each single-row bar is mechanically processed while it remains an integral part of the double-row bar, or after it is bonded to a fixture as an integral part of a double-row bar followed by severance of the bonded double-row bar into two single-row bars. The process eliminates or materially reduces any inducement of bow of the bar, which is a serious cause of throat height control problem associated with the prior fabrication methods.

22 Claims, 10 Drawing Sheets

THIN FILM HEAD SLIDER FABRICATION PROCESS

Matter enclosed in heavy brackets [ ] appears in the original patent but forms no part of this reissue specification; matter printed in italics indicates the additions made by reissue.

FIELD OF THE INVENTION

This invention relates generally to fabrication of thin film electromagnetic read/write head assemblies, and particularly to a method for fabricating thin film head sliders from a pre-processed wafer which contains on one face a plurality of electromagnetic devices arranged in rows.

BACKGROUND OF THE INVENTION

Magnetic disk drive systems are used to read and write information to and from magnetic disks. Typically, the disk is mounted on a spindle such that the disk can rotate to permit an electromagnetic head mounted on a movable arm positioned near the disk's surface read or write information thereon.

During operation, the system moves the head to a desired radial position on the surface of the rotating disk where the head electromagnetically reads or writes data. Usually, the head is integrally mounted in a carrier called a "slider." A slider generally serves to mechanically support the head and any electrical connections between the head and the rest of the drive system.

Since the slider is aerodynamically shaped to glide over moving air, it generally maintains a uniform distance from the surface of the rotating disk, thereby preventing the head from undesirably contacting the disk.

Typically, a slider is formed with two parallel rails with a recessed area between the rails and with each rail having a ramp at one end. The surface of each rail that glides over the disk surface during operation is known as the "air-bearing surface."

A head is typically an electromagnetic device containing magnetic poles. These poles terminate on the air bearing surface and function to electromagnetically interact with the data contained in the magnetic disk.

According to the prior methods, a group of thin film sliders are fabricated from a single wafer that contains on its top face electromagnetic devices, i.e., heads, arranged in rows. Initially, single-row bars are sliced from a wafer, each bar comprising a row of units which can be processed into sliders having heads on their end faces. Each bar is then bonded to a fixture where the bar is then processed and separated into individual sliders.

During this process, it is critical to lap the bar to a desired thickness in order to achieve a desired throat height, i.e., the height of a pole above the pole widening point, for all the poles on the bar. The single-row bars tend to bow or bend. making it very difficult to attain this objective.

There is a need, therefore, to solve the bow problems associated with single-row bars so that sliders with desirable throat heights can be easily fabricated.

SUMMARY OF THE INVENTION

Accordingly, it is a general object of the present invention to provide a head assembly fabrication method which greatly improves the control of an important performance parameter of magnetic recording heads. i.e., throat height.

Mechanical processing of thin bars, which incline to bow, to fabricate sliders is the main cause of throat height control problems. The present invention provides a solution to these problems by thickening the workpieces. Since the bowing of an object is inversely proportional to the cube of its thickness, this reduces bowing of the workpieces to negligible proportions.

More specifically, we increase the effective thickness of a bar to be fabricated into sliders by anchoring it to a relatively rigid and thick object before it is severed to a single-bar status. As a result, the resistance of the bar to bowing is materially enhanced, and an identical and desired throat height for the poles on such a bar can be easily attained by lapping.

Four embodiments are disclosed herein. Two of them use the wafer from which the bars are formed to add effective thickness to the bar and thereby resist bending or bowing of the bars. The other two operate on integral pairs of bars, the bars in each pair being severed from each other only after they have been bonded to a fixture or have been mechanically processed. Even the latter embodiments of the invention effectively solve the bow problems by doubling the thickness of a bar, since they provide an increase of an order of magnitude in the stiffness of the workpieces. Thus, the foregoing embodiments represent the maximal and minimal applications of the concept, namely, effectively thickening the workpieces.

A wafer used for fabrication of sliders typically comprises rows of bars; each row can be processed to form a plurality of sliders. In the first embodiment of this invention, a single-row bar is lapped to the desired throat height while remaining integral with the remainder of the wafer. The bar is later sliced from the wafer only after it has been fabricated into sliders.

The second embodiment differs from the first one in that a single-row bar is sliced from the wafer after it has been bonded to a lapping fixture. Bonding of a single-row bar to a fixture in this manner induces no or little bow on the bar, as compared with bonding of a free standing single-row bar. Nor does lapping of such a single-row bar cause the bar to bow, since the future increases effective thickness, or resistance to bowing, of the bar.

According to the third and fourth embodiments, a double-row bar sliced from a wafer is first bonded to a lapping fixture before it is lapped or sliced into two single-row bars.

In none of the embodiments is it necessary to bond a free standing, single-row bar to a lapping fixture. In other words, a single-row bar is lapped only when it is anchored to a relative rigid and thick object under conditions which induce no bow on it.

There are several advantages to this invention. First of all, it solves all the bow problems associated with the use of a free-standing single-row bar. In addition, it improves air beating surface ("ABS") flatness, another important performance parameter, of raiders. This problem is lessened by the present invention, since it is now possible to lap sliders in a bar without bonding the bar to a transfer tool and without inducing bow of the bar. The adhesive bond is known to adversely effect ABS flatness.

Also, the cycle time for slider fabrication is materially reduced, as many intermediate processing steps may be eliminated, including visual inspection of throat heights using lapping guides as the indicator. Thus, it is no longer necessary to fabricate one lapping guide for each head on the wafer. All these lead to decrease in production costs.

The above and further advantages of the invention may be better understood by referring to the following description in conjunction with the accompanying drawings.

Figure 1:
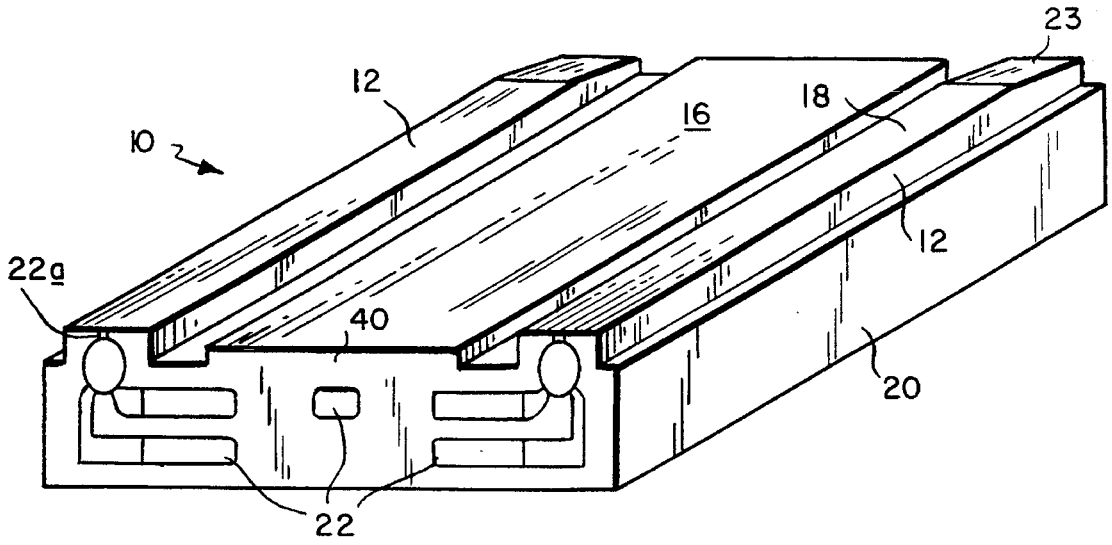
FIG. 1 is a perspective view of a typical 2-rail design thin film head slider.

In all the drawings, identical numbers represent identical or similar elements. Various elements shown in the drawing are not necessarily in proportion to their actual sizes. Further, as used herein the terms such as "top", "bottom" and the like are intended only to denote relative direction solely with reference to the illustrations in the accompanying drawings.

DETAILED DESCRIPTION OF ILLUSTRATIVE EMBODIMENTS

In FIG. 1 we have illustrated a typical 2-rail, thin film head slider. This slider, designated by the numeral 10, is generally rectangular in shape. It consists of two portions, i.e., a slider portion 20 and a head portion 40 on an end face of the slider portion 20.

The slider portion 20, which constitutes the bulk of the thin film head slider 10, is made of $Al_2O_3$-TiC or other suitable material. This portion 20 comprises, in general, two parallel rails 12 on both sides of a recessed face 16 of the slider 10. The top surface 18 of each rail 12 constitutes an air bearing surface of the slider 10. At the end of the air bearing surface 18 opposite the head portion 40 is a slope or a ramp 23. The rails 12, the recessed face 16, and the air bearing surfaces 18 are all important structural features that enable the head portion 40 to "fly" at a short distance from the surface of a magnetic disk.

The head portion 40 is a thin layer of $Al_2O_3$ containing an electromagnetic device 22 which is constructed by a conventional photolithography process. The electromagnetic device 22 includes poles 22a that terminate at their upper ends on the surface 18 of the rails 12. The device 22 also includes other components which are unrelated to the present invention. The poles 2242 are made of a suitable ferromagnetic material such as NiFe. As mentioned above, for a thin film head slider 10 to function properly, it is important that the throat height, i.e., the height of pole 22a above a so-called "pole widening point" (not shown), be near "zero throat" or about 40 microinches.

Figure 2:
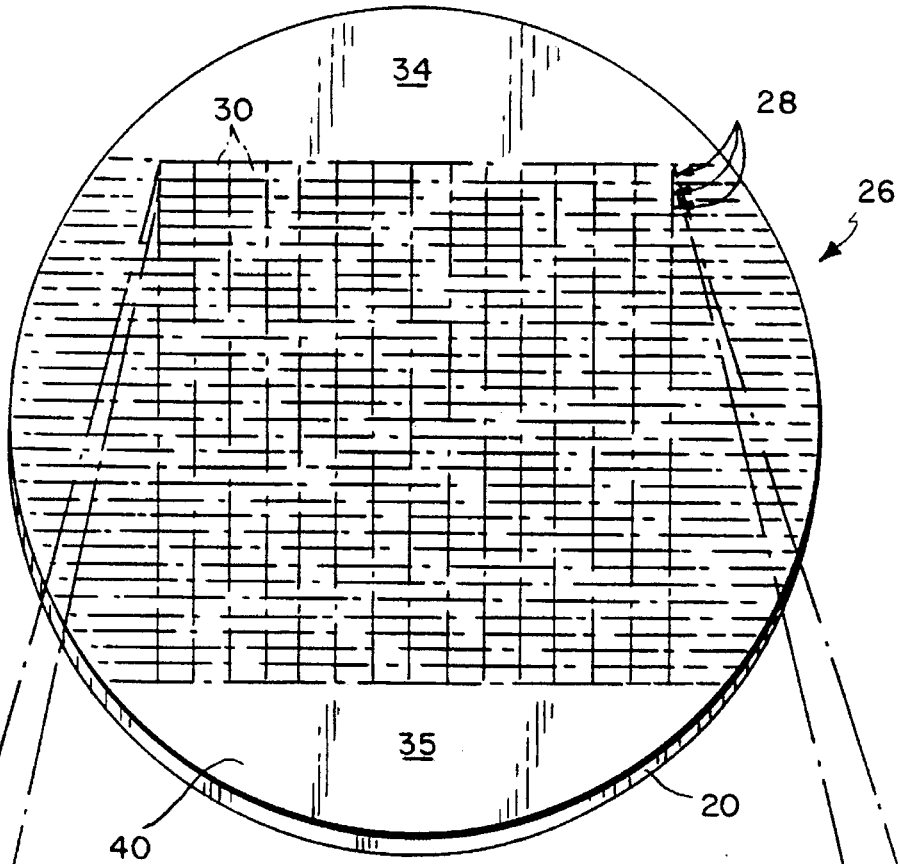
FIG. 2 is a perspective view of a pre-processed wafer and FIGS. 2A and 2B depict detailed structure thereof, from which the FIGS. 1 and 6 sliders are fabricated according to the processes depicted in FIGS. 3 and 7.
Figure 2A:
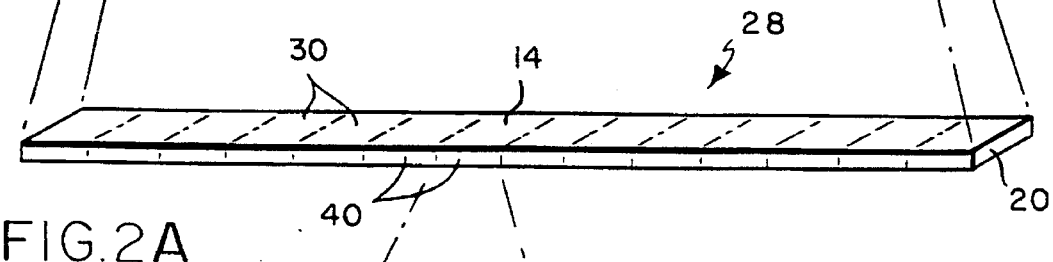
Figure 2B:
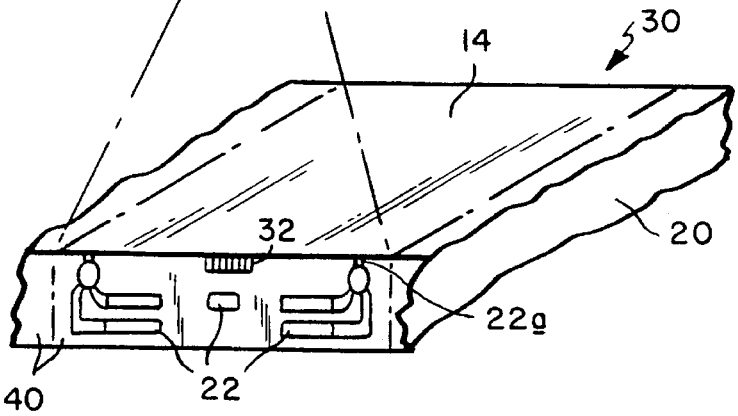

The above-described 2-rail, thin film head slider 10 has been fabricated from a pre-processed wafer. FIGS. 2, 2A and 2B depicts the structure of such a wafer The wafer 26 comprises a wafer substrate 20 that is made of $Al_2O_3$-TiC, and is covered by a thin layer 40 of $Al_2O_3$. The electromagnetic devices 22 are formed in the layer 40. The devices 22 are arranged in rows and are identically oriented.

Specifically, the wafer 26 comprises a matrix of slider units 30 which when fully processed will become sliders 10. The view shown in FIG. 2 is an end view of the individual units 30, the devices 22 having been formed on the ends of the units 30 exposed in this view. As shown in FIG. 2, a plurality of identical bars 28 each of which comprises a row of identical slider units 30, together with superfluous sections, such as a top section 34 and a bottom section 35, constitute the wafer 26.

A wafer may be fabricated to contain any desirable number of rows of slider units 30 and any desirable number of slider units 30 in each row. The pre-processed wafer 26 shown in FIG. 2A contains thirty two rows of slider units 30, and fourteen slider units 30 in each row.

The slider unit 30 shown in FIG. 2B is identical with the finished slider 10 shown in FIG. 1, except that the rails 12 and recessed face 16 are not yet formed and the throat height for the poles 22a is greater in the unit 30. Since the throat height for poles 22a in each unit 30 is greater than that in finished slider 10, lapping of the face 14 of each unit 30 in a controlled manner is accomplished to obtain a slider 10 with the desired throat height. This is achieved by the provision of a lapping guide 32 in each unit 30 when the wafer is fabricated (see FIG. 2). Under the prior methods of fabrication, the lapping guide 32 can be used as an indicator of the throat height during microscopic inspection of the processed unit 30, as will be discussed below.

Figure 3:
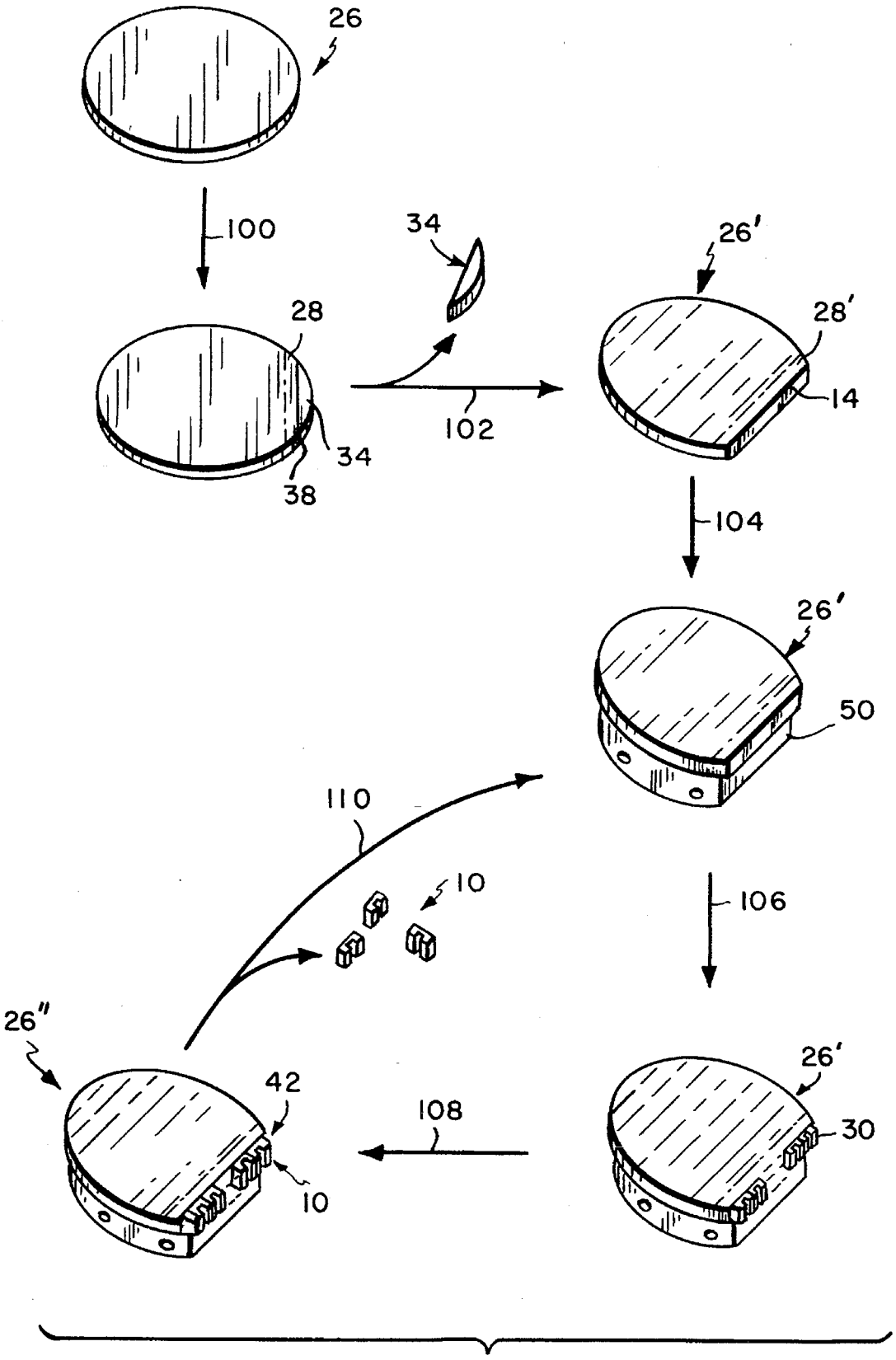
FIG. 3 is a schematic representation of one embodiment in accordance with the present invention.

One embodiment of the inventive process for fabricating the sliders is depicted in FIG. 3. A single slice cut 38 is first made on the wafer 26 to remove the top superfluous, non-functional section 34 (steps 100 and 102), thus exposing the face 14 of an outermost bar 28. It should be noted that the face 14 is the face on which the poles 22a terminate (see the lowermost view of FIG. 2).

Once the slice cut 38 is made, the sliced wafer 26' is affixed to a fixture 50 in such manner so that the exposed face 14 of the outermost bar 28' is susceptible to mechanical processing, while the bulk of the sliced wafer 26' is secured to the future 50 (step 104). The fixture 50 is referred to as the lapping future hereinafter, since throat lapping (i.e., lapping the throat height to a desired height), as well as other mechanical processmg operations, is performed on the outermost bar 28' while the wafer is affixed to this fixture 50.

Figure 4:
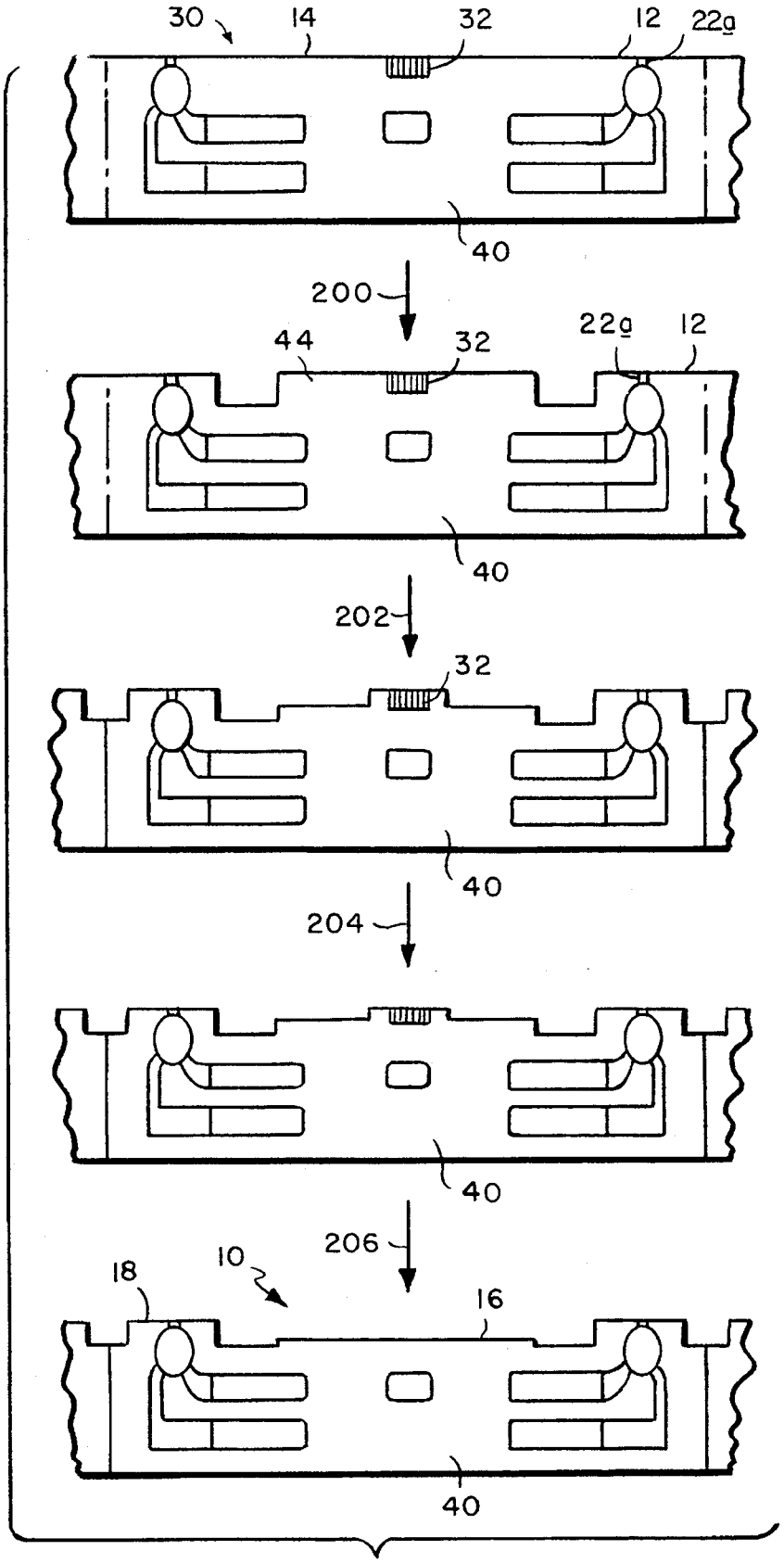
FIG. 4 illustrates one approach for mechanically processing a bar containing electromagnetic devices into FIG. 1 sliders, the bar being shown in side elevation.
Figure 5:
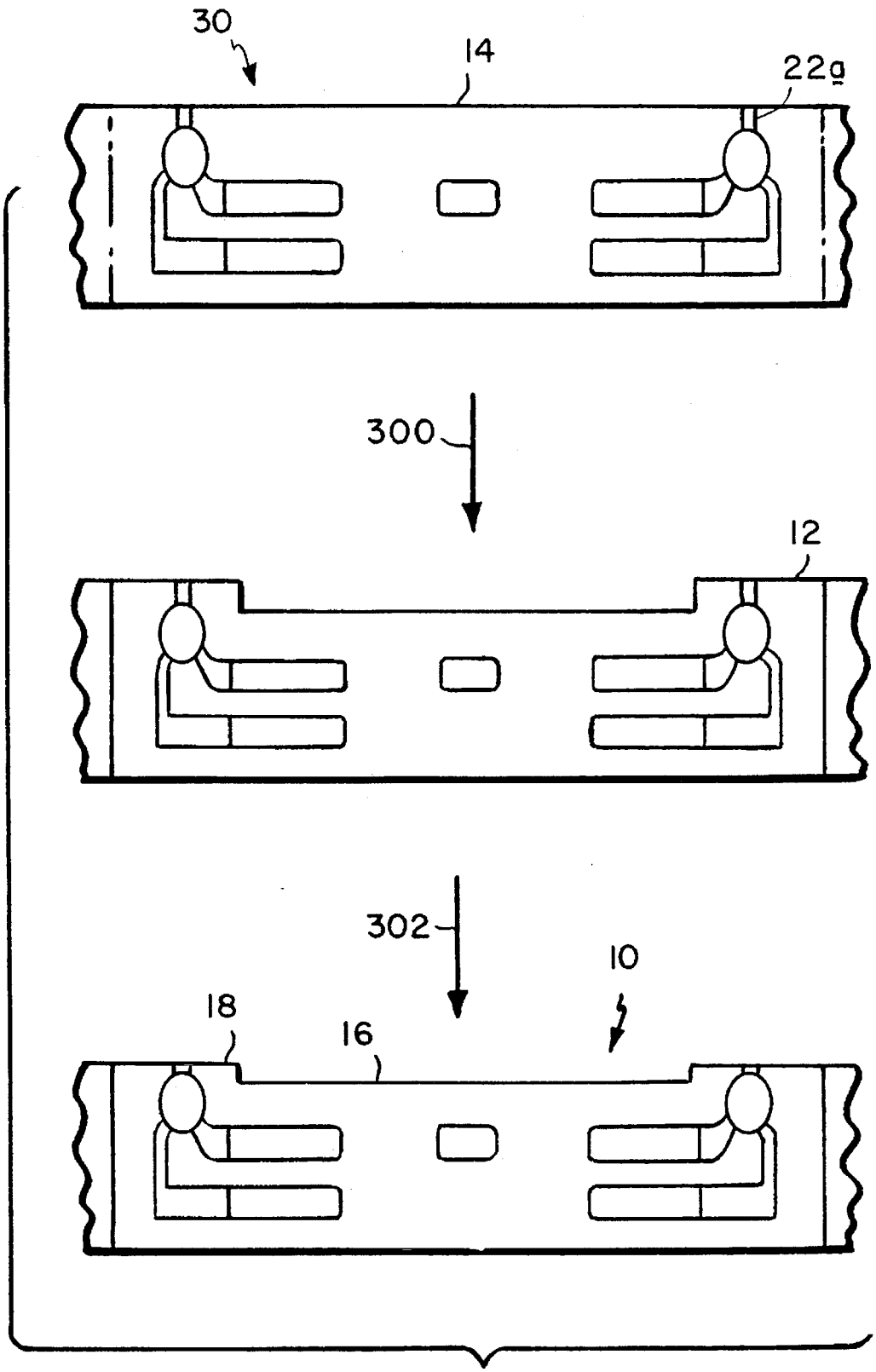
FIG. 5 illustrates another approach for mechanically processing a bar containing electromagnetic devices into FIG. 6 sliders, the bar being shown in side elevation.

In the next step 106, the exposed face 14 is subjected to a series of grinding and lapping processes to define the air bearing surface rails 12, to form ramps 23 on the rails 12, to create a recessed face 16 between the air bearing surface rails 12, and to obtain a proper throat height for the poles 22A on the bar 28 (see FIG. 1). The bar 28' thus processed is then subjected to the part-off process, i.e., vertical cuts are made to separate the slider units 30 therein. These rail definition, ramp formation, part-off, throat lapping and rail relief processes may be performed in two different ways, which are shown in FIGS. 4 and 5, respectively, and will be discussed in more detail below.

The processed bar 28' is then sliced into individual thin film head sliders 10 by making a single cut 42 extending through the sliced wafer 26' (step 108). The remainder of the wafer, together with the sliders 10 thus formed, is then removed from the lapping fixture 50 (step 110). The reduced sliced wafer 26" can now be realigned and fastened onto the same fixture 50 so that the newly exposed face from the cut 42 is susceptible to mechanical processing, and the entire sequence is repealed until all bars on the wafer have been processed into individual sliders.

Since the sliced wafer has to be fastened to and detached from the lapping fixture 50 repeatedly, it will be more effective to affix the wafer to the fixture 50 by means of readily releasable mechanical clamp, instead of using a bonding agent.

Also, since the wafers are relatively fragile and may crack when subjected to excessive external form, it is desirable to bond each wafer to a lava substrate (not shown) so that the wafer can be indirectly secured to the fixture via the substrate during the entire fabrication process. The substrate portions attached to the individual sliders 10 are removed at the end of the fabrication process by debonding.

According to the prior method of fabricating sliders from a wafer, the wafer is first sliced into free-standing single-row bars. The single-row bars are then each fastened to a fixture via the slice surface distal from the poles, using an adhesive for grinding and lapping. As mentioned above, in order for a thin film head slider, such as that shown in FIG. 1, to function properly, the throat height has to be within a precise range. This is achieved by lapping the exposed slice surface of the single-row bar until all the poles on the bar attain near "zero throat" with the aid of lapping guides. However, all poles on a single-row bar can be lapped simultaneously to the desired and identical throat height only if all the electromagnetic devices on the single-row bar are colinear during the throat lapping process.

The task of maintaining colinearity of the electromagnetic devices on a free-standing single-row bar is very difficult for several reasons. First of all, since a single-row bar is very thin (about 0.025 inches), it tends to bow. Fuxthermore, each single-row bar has two slice surfaces. These slice surfaces tend to have non-homogeneous stresses because of the slice cuts. Such stresses also cause the bar to bow. To minimize this effect, both slice surfaces are usually lapped to remove the stressed material before fastening to a lapping fixture. Also, the bonding process for fastening a free-standing single-row bar to a lapping fixture may induce bow on the bar.

The bow problems associated with a free-standing single-row bar result in different throat heights of the sliders fabricated by the prior methods. Such variance in throat heights, in turn, affects the read/write performance of the sliders- Processing a free-standing single-row bar also results in another drawback, i.e., unevenness of the air beanng surfaces. Although the flatness requirement for the air bearing surfaces is easier to attain than the throat height requirement for the poles, it nonetheless is somewhat difficult to meet when processing a free-standing single-row bar.

Both of these problems, which result from the bow of a free-standing single-row bar, are essentially eliminated in the fabrication process embodiment of the present invention described above, since a stiff, solid wafer rather than a bar, is lapped according to this new method and a solid wafer does not bow. The poles of all electromagnetic devices on one bar can therefore be lapped to an identical, specific throat height. In addition, according to the present invention, it is no longer necessary to lap the exposed slice surface to release stresses on it before bonding the sliced wafer to a lapping fixture. Neither is it necessary to perform the difficult task of bonding a very thin bar to a lapping fixture. Instead, a sliced wafer, which is relatively solid and large, can be easily fastened to such a fixture before it is further processed into sliders.

Refer now to FIG. 4, which schematically illustrates one approach that may be taken to perform step 106 in FIG. 3, namely, to contour the exposed surface 14 of a wafer 26' fastened to a lapping future 50 to form sliders 10. For each unit 30, two parallel rails 12 on both sides and a third rail 44 between them are first formed on the surface 14, where the poles 22a terminate, by a grinding operation (step 200). A second grinding operation further defines the parallel rails 11 (step 202). One can also cut and divide all the units 30 in the bar from each other at this step.

Since throat lapping must be stringently controlled, it is the most time-consuming operation in the prior slider fabrication process, and is thus preferred to be performed only after the grinding operations are completed so that only minimum surfaces have to be lapped. Also the lapping guide 32 is kept intact throughout both grinding operations (steps 200and 202) so that it can be subsequently used to control the lapping of poles 22a to a specific throat height. Once the poles 22a are lapped to near "zero throat" (step 204), a ramp (not shown FIG. 4) is then lapped on each of the air bearing surfaces 18 which are formed by the just-mentioned throat lapping operation. Finally, a third grinding operation (step 206) is performed to relieve the area between the parallel rails 12 to form the recessed face 16, and a slider 10 is thus fabricated. As mentioned above, the recessed area 16 thus formed, together with the air bearing surfaces 18 and ramps, are important structural features of a slider 10.

The grinding and lapping step depicted in FIG. 4 are similar to those used in the prior single-row bar fabrication process. In particular, a lapping guide 32 is included in the central region of the head portion 40 in each unit 30 and is not removed by grinding until the throat lapping step is completed, as shown in FIG. 4. This is because it is necessary to inspect each unit for throat height by viewing the lapping guide in that unit to ensure that a desired throat height has been attained. However, since the bar being lapped does not bow according to the FIG. 3 embodiment, it is no longer necessary to inspect all the throat heights during and after the throat lapping process. It follows that inclusion of a lapping guide in the central region of the head portion in every unit and its removal only subsequent to the throat lapping step are not necessary either.

FIG. 5 depicts an alternative grinding and lapping approach that may be incorporated into step 106 of FIG. 3 for fabricating sliders 10. This process is made possible by elimination of the need to visually inspect each unit during and after the throat lapping process as discussed above.

The bar shown in FIG. 5 contains only one lapping guide at each end thereof (not shown). Two parallel rails 12 are readily formed in one single grinding operation (step 300), as compared to the FIG. 4 approach which uses three separate grinding operations (steps 200, 202, and 206). The bar can also be cut to divide all the units 30 therein from each other at this step. Lapping, step 302, is then performed to attain the desired throat heights by making use of the two lapping guides. After all poles 22a on the bar have been lapped to the desired throat height, a ramp is lapped on each of the air beating surfaces 18 (the step not shown). As shown in FIG. 5, the part-off step, i.e.. separation of sliders 10, is implemented before the throat lapping process although it can also be performed thereafter if desired.

Figure 6:
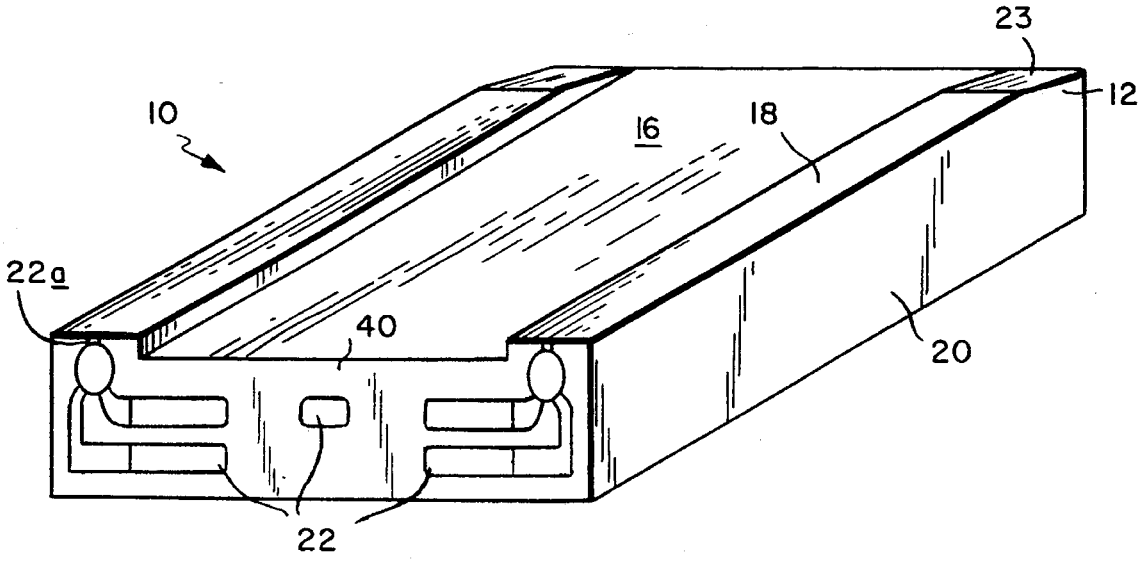
FIG. 6 is a perspective view of a modified 2-rail design thin film head slider.

A slider 10 fabricated following the procedure depicted in FIG. 5 is shown in FIG. 6. Although there are minor structural differences between the sliders 10 shown in FIGS. 1 and 6, both are functionally identical in their read/write performance.

Figure 7:
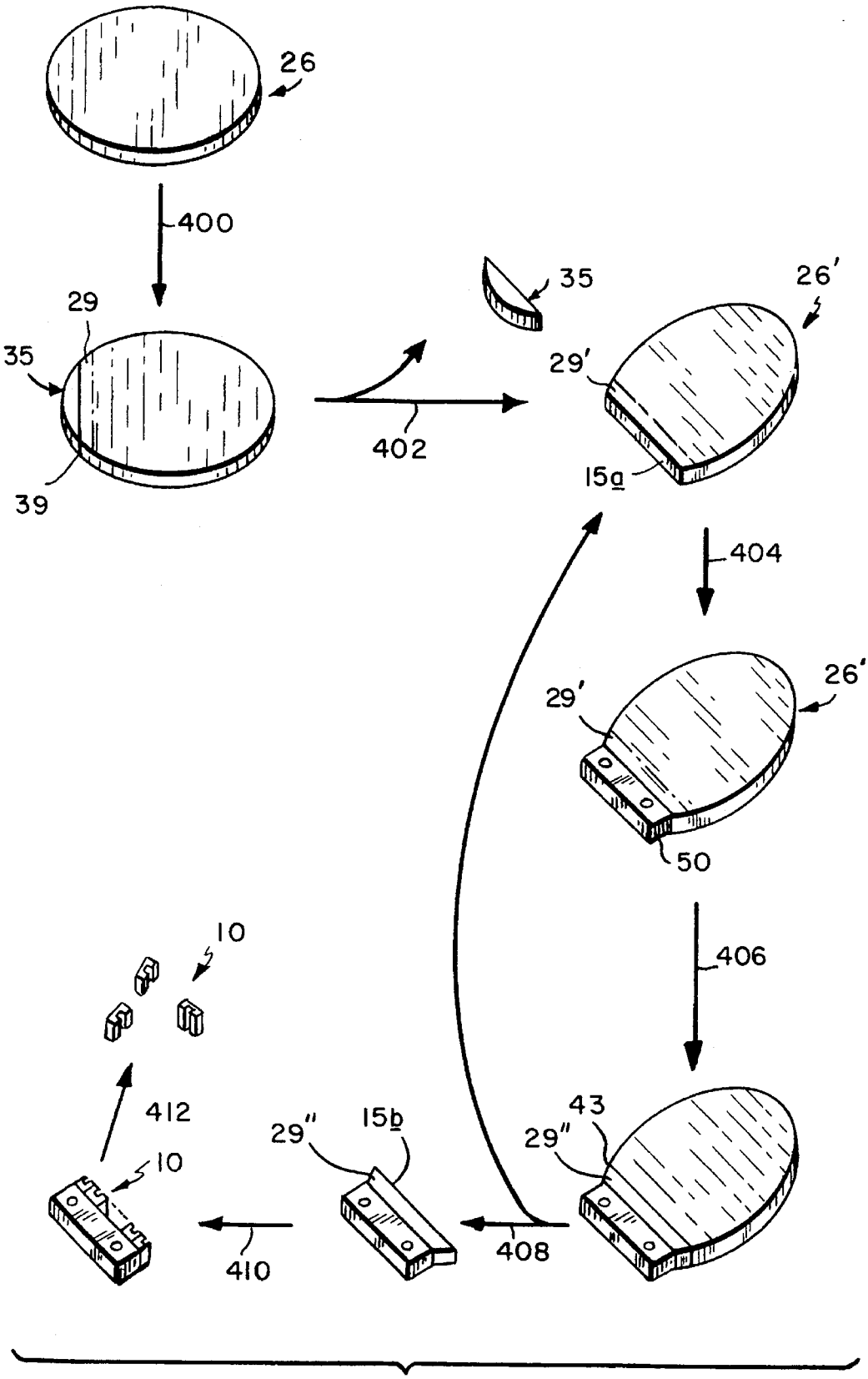
FIG. 7 is a schematic representation of a second embodiment in accordance with the present invention.

Another embodiment of the present invention is schematically represented in FIG. 7 and will be described below with reference to FIGS. 1 to 6.

In this embodiment, a superfluous section 35 of the wafer 26 is first sliced from the wafer 26 by a single cut 39 to expose one surface 15a of the outermost bar 29 (steps 400 and 402). Note that removal of superfluous section 35, unlike removal of section 34 (FIG. 3), results in a slice surface 15a which is distal from the poles 22a. As a result, the sliced wafer 26' is not ready to be processed. In order to expose a surface on which the poles 22a terminate so that throat lapping and other processing steps can be performed, the sliced wafer 26' is first bonded to a lapping fixture 50 via the slice surface 15a (step 404). Before the bonding, the slice surface 15a may be lapped to remove any stressed material, if necessary.

The outermost bar 29' is then separated from the remainder of the sliced wafer 26' by another slice cut 43 (steps 406 and 408). The single-row bar 29, while fastened to the fixture 50, now has a slice surface 15b on which the poles 22a terminate and which can be contoured following the approach of FIG. 4 or FIG. 5 to produce the sliders 10 as shown in FIGS. 1 and FIG. 6, respectively (step 410). Finally, the sliders 10 thus fabricated are debonded from the lapping fixture 50 (step 412). The same process can be repeated until all bars in the wafer 26' are fabricated into sliders 10.

In the FIGS. 3 and 7 embodiments of the invention, the single-row bars are never bonded or clamped to a lapping fixture 50 when they are free-standing. That is, each bar remains an integral part of the wafer when it is fastened to the lapping fixture 50 on which it is processed into sliders. This prevents the bow that occurs when a free standing single-row bar is mounted on a fixture. As a result, the colinearity of the electromagnetic devices on the bar is maintinned during the fastening process.

The wirer 26 used in the FIGS. 3 and 7 embodiments of this invention contains on its top face electromagnetic devices 22 of identical orientation (see FIG. 2 and description thereof). By contrast, the two further embodiments as illustrated in FIGS. 9 and 11 are implemented with wafers 52 and 62 (FIGS. 8 and 10), respectively, where the electrumagnetic devices 22 on each row are oriented in a direction which is opposite to that of the adjacent row(s).

Figure 8:
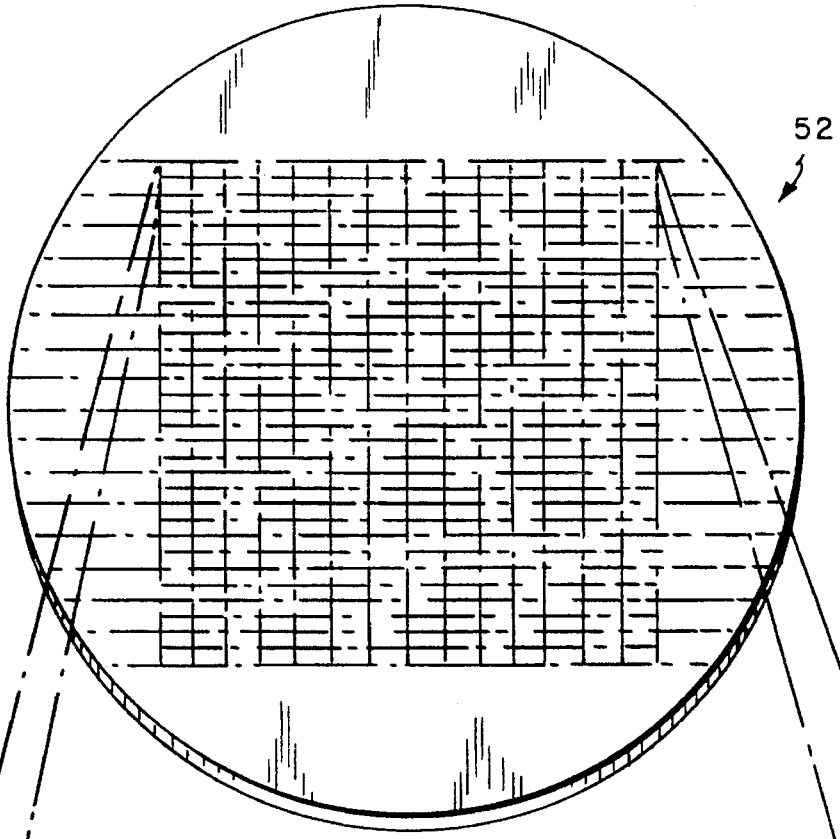
FIG. 8 is a perspective view of a pre-processed wafer and FIGS. 8A and 8B depict well as detailed structure thereof, from which the FIGS. 1 and 6 sliders are fabricated according to the process depicted in FIG. 9.
Figure 8A:
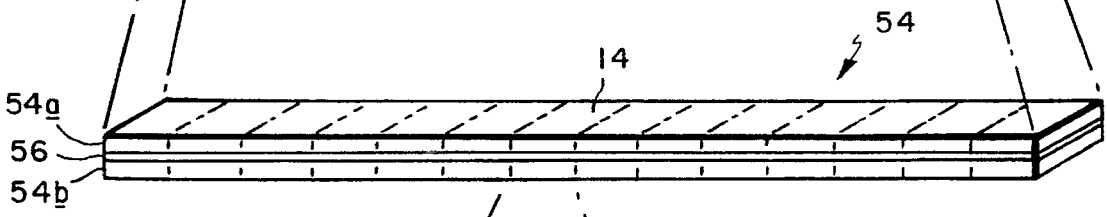
Figure 8B:
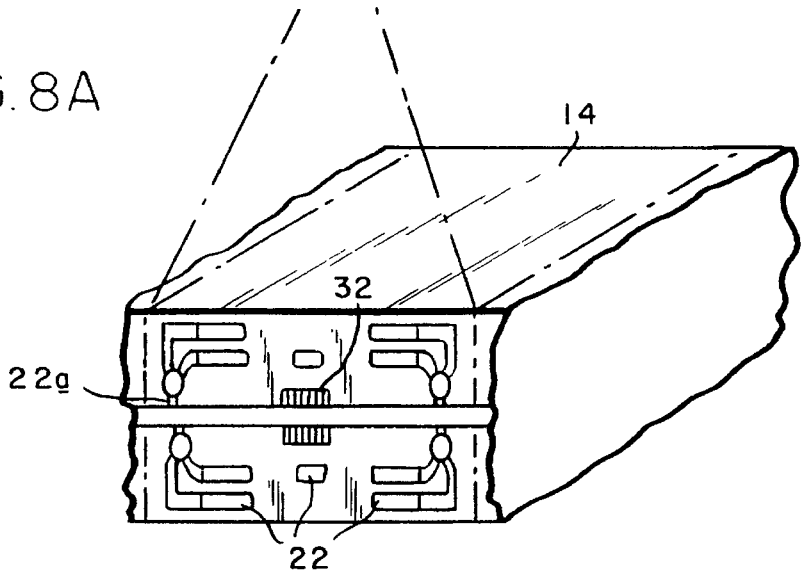

More specifically, as shown in FIGS. 8, 8A and 8B, the top two rows 54a and 54b of electromagnetic devices 22 of a wafer 52 have devices 22 arranged with the poles 22a on row 54a face those on row 54b, with a "street" 56 disposed between the two rows 54a and 54b. The "street" 56, unlike rows 54a and 54b which contain electromagnetic devices 22, is void of any functional elements. As will be explained below, it serves to provide tolerance in slicing the double-row bar 54 into two single-row bars 54a and 54b, and also serves to provide some thickness which greatly contributes to the solution of the bow problems associated with processing of single-row bars. A "street" with a thickness 61% that of a single-row bar has been found to be satisfactory for both purposes.

For the wafer 52 shown in FIG. 8, the same row-street-row pattern is repeated 16 times. As a result, 16 identical double-row bars 54 can be obtained by properly slicing the wafer 52. For each double-row bar 52 sliced from the wafer 51, the poles 22a on both rows and 52b remain embedded and are thus not ready to be lapped.

Figure 9:
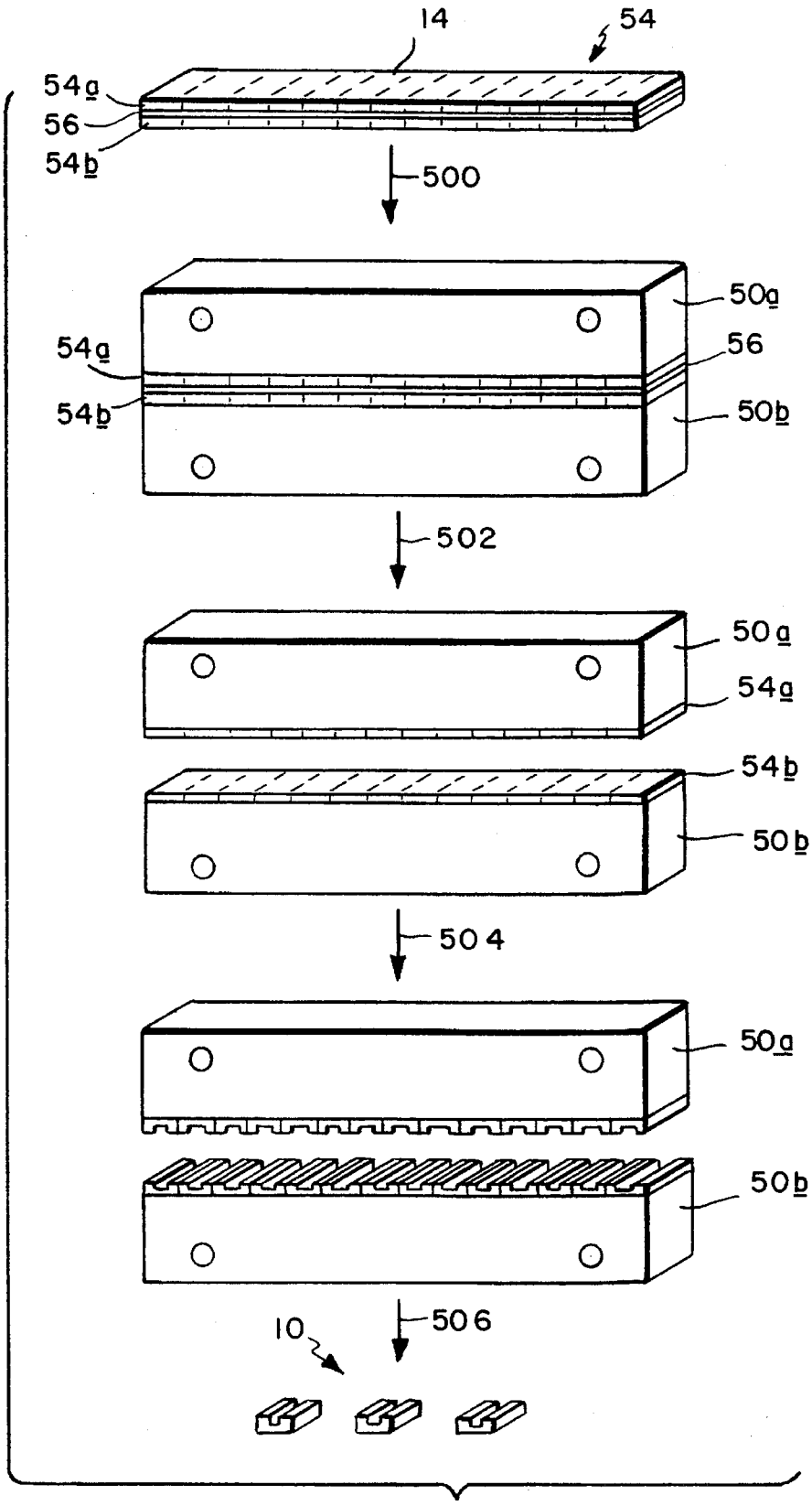
FIG. 9 is a schematic representation of a third embodiment in accordance with the present invention.

FIG. 9 shows how the wafer 52 in FIG. 8 is processed. In the first step (step 500), a double-row bar 54 is bonded simultaneously, via the slice surfaces 14, to two lapping fixtures 50a and 50b. The double-row bar 54 is then sliced, along the "street" 54, into two singlerow bars 52a and 52b (step 502). The two single-row bars 52a and 52b remain fastened to the fixtures 50a and 50b, respectively, after the slice cut. Provision of the street 56 minimizes the likelihood that the poles are inadvertently damaged during this slice cut. With the poles exposed by the slice cut, the grinding and lapping processes of FIG. 4 or FIG. 5 are then followed to contour each single-row bar 52a or 52b to form sliders 10 of FIG. 1 or FIG. 6 (step 504). Finally, the individual sliders 10 are debonded from the fixtures 50a and and 50b (step 506).

Figure 10:
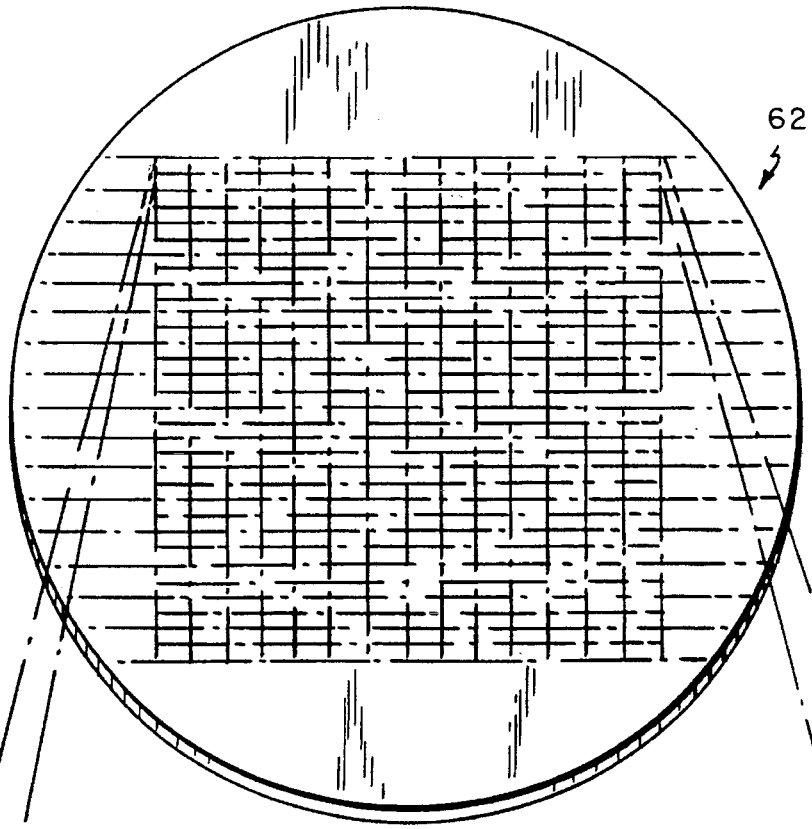
FIG. 10 is a perspective view of a pre-processed wafer and FIGS. 10A and 10B depict detailed structure thereof, from which the FIGS. 1 and 6 sliders are fabricated according to the process depicted in FIG. 11; and, FIG. 11 is a schematic representation of a fourth embodiment in accordance wnh the present invention.
Figure 10A:
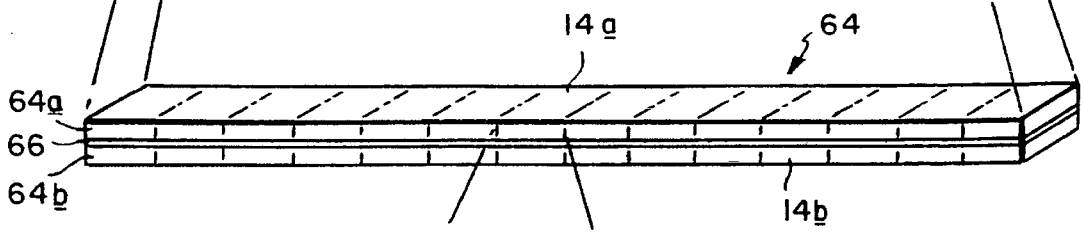
Figure 10B:
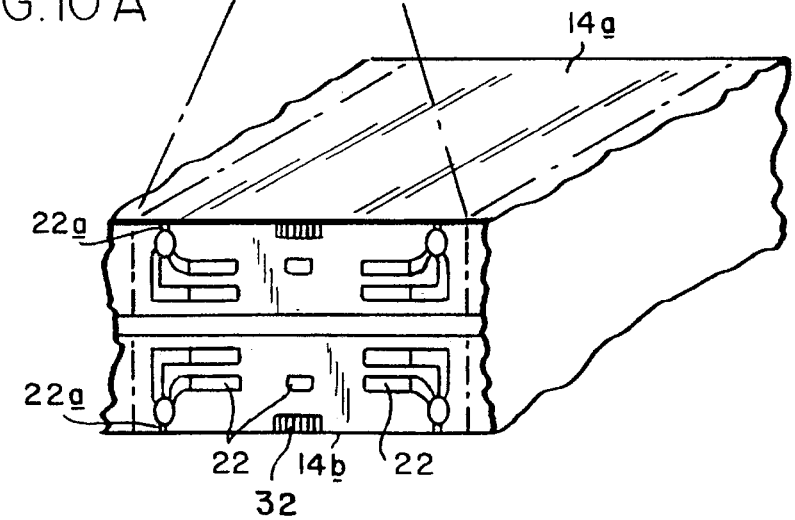
Figure 11:
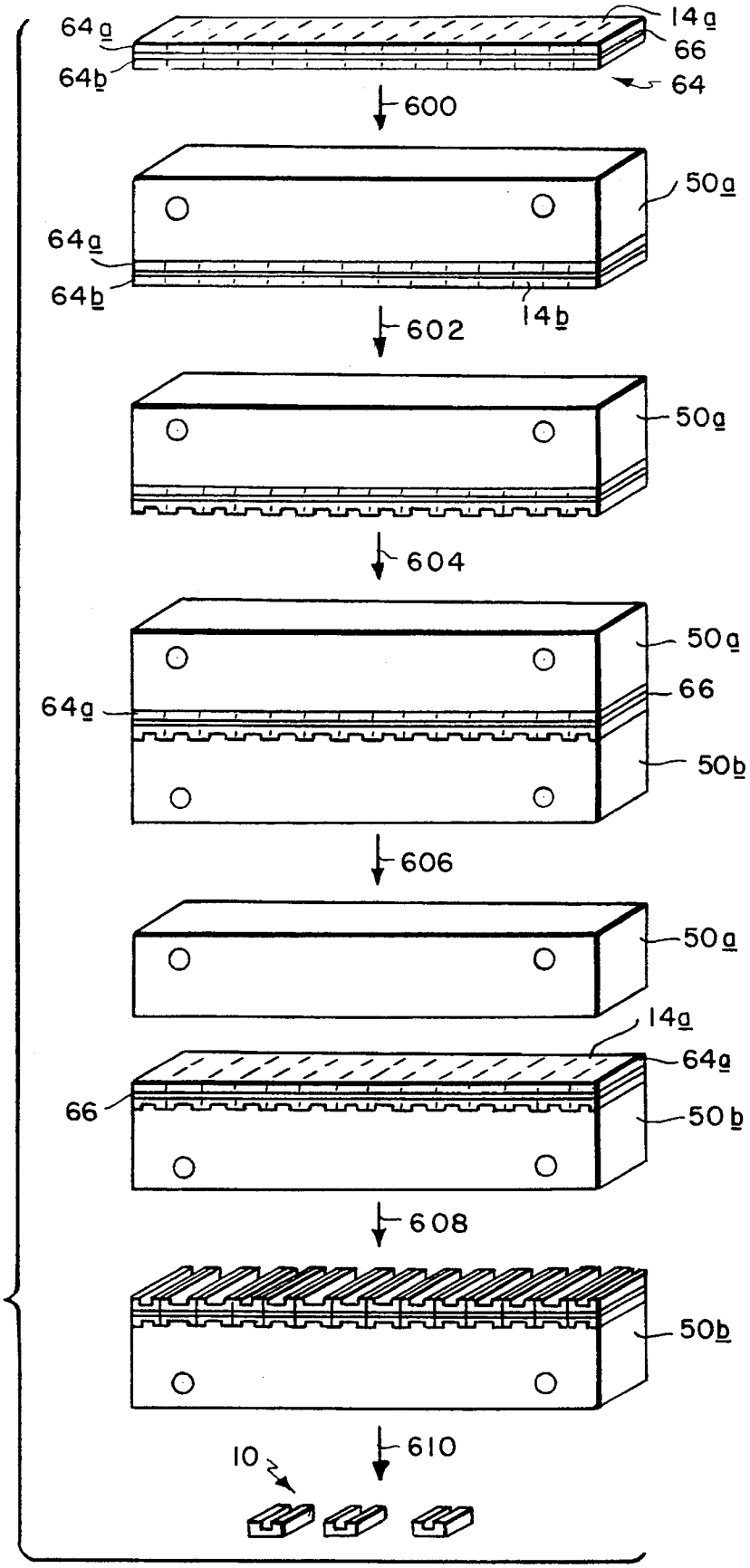

The structure of a wafer 62, which can be used in the FIG. 11 embodiment, is shown in FIGS. 10, 10A and 10B. The electromagnetic devices 211 on the top two rows of the wafer 62 are arranged so that the poles 22a on the top row 64a are distal from those on the second row 64b, and vice versa. A "street" 66 similar to that provided in wafer 52 in FIG. 9 spaces the two rows 64a and 64b apart for the purposes stated above. Repetitions of the same row-street-row pattern on the wafer 62 enable one to produce a plurality of identical double-row bars 64 by repeated slice cuts. Each double-row bar 64 thus produced has poles 22a that terminate on both slice surfaces 14a and 14b. As Shown in FIG. 11, a double-row bar 64 is bonded to a lapping fixture 50a via one of its slice surfaces 14a (step 600). The slice surface 14a may first be lapped to remove stressed material prior to the bonding, if necessary. The exposed slice surface 14b of the double-row bar 64 is then mechanically processed following the steps of FIG. 4 or FIG. 5, except that the part-off operation is not performed (step 602) In the next two steps 604 and 606, the processed slice surface 14b is bonded to a second lapping fixture 50b, and the unprocessed surface 14a is debonded from the first fixture 50a. The unprocessed slice surface 14a is now exposed and subjected to the gnnding and lapping processes (step 608). The part-off cuts are then made in such a way as to extend both rows 64a and 64b, so that the sliders on both rows 64a and 64b are divided (also, step 606).

Finally, a slice cut along the "street" 66, followed by debonding from the second lapping fixture 50b, releases the individual sliders 10 (step 610).

Note that in contrast the prior fabrication methods in which a single-row bar ts bonded to a lapping fixture, both the FIG. 9 and FIG. 11 embodiments bond a double-row bar to one or two lapping fixtures, followed by a slice cut of the double-row bar into two single-row bars. This approach essentially eliminates the bow problems associated with the mechanical processing of a free-standing single-row bar.

Specifically, the degree that an object bows in the presence of an external deflection force is determined by both the thickness of the object and the magnitude of the force. That is, the degree of bow is proportional to the magnitude of the deflection force and inversely proportional to the cube of the object's thickness. Therefore, the resistance of an object to bowing rises very rapidly with the increase in thickness. For example, a double-row bar, which contains a "street" with a thickness 61% of a single-row bar, is 2.61 times as thick as a free-standing single-row bar, and the bow of this double-row bar will only be $2.61^{-3}$, or 5.6%, that of a single-row bar for the same deflection force.

Similarly, in both FIGS. 3 and 7 embodiments, a sliced wafer, which is very much "thicker" than a single-row bar, is always fastened to a lapping fixture as the initial step in processing the wafer into sliders. As a result, any bow is essentially negligible. Even when only one last single-row bar remains on the sliced wafer for mechanical processing, the "thickness" of this reduced sliced wafer, which consists of the superfluous section 34 or 35 and the last single-row bar, is still much greater than that of a freestanding single-row bar.

Despite their operational differences, there is one single concept which underlies all the four embodiments as illustrated in FIGS. 3, 7, 9, and 11. That is, it is critical not to process a free-standing single-row ban at all times. In other words, one should always have a single-row bar anchored to a relatively rigid and thick object so that the single-row bar becomes highly unlikely to bow, both before and after it is fastened to a lapping future for mechanical processing.

The present invention is to embrace all head assembly fabrication processes which are covered by the concept discussed above., namely, a single-row bar does not bow, or only bows very slightly, if a relatively rigid and thick object is anchored thereto. Thus, although the foregoing description bas been limited to specific embodiments of this invention, it will be apparent, however, that variations and modifications may be made, with the attainment of some or all of the advantages of the invention.

For example, the relatively rigid and thick object to which a single-row bar is anchored, as taught in this invention, can be any suitable material, including an unprocessed wafer. As another example, while fabrication of thin film head sliders for a magnetic disk drive system is disclosed herein, the similar process can also be used to manufacture head assemblies to be used in a magnetic tape drive system. Therefore, it is the object of the appended claims to cover all such variations and modifications as come within the true spirit and of the invention.

What is claimed is:

1. A process for the fabrication of electromagnetic head assemblies from a bar on a first surface of which a plurality of electromagnetic devices are provided as a single row and with like orientation, the bar being integral along a second surface with an adjacent substrate portion, which fabrication process comprises the steps of:

anchoring the [first surface] *substrate portion* to a fixture, while the [bar] *substrate portion* is anchored [along the first surface], forming head assemblies along *a third surface of* the bar, *the third surface being opposed to the second surface;* and separating the individual head assemblies.

2. The process defined in claim 1 wherein the adjacent substrate portion is anchored to a fixture with a side surface of the bar, which is opposed to the second surface, exposed [for said] *to facilitate thereon* mechanical operations *that form the head assemblies.*

3. The process defined in claim 2 wherein the adjacent substrate is a wafer.

4. The process defined in claim 2 wherein the adjacent substrate is a second bar identical to the first bar.

5. The process defined in claim 1 further comprising the step of severing the bar from the adjacent substrate portion to expose the second surface of the bar for the mechanical operations.

6. The process defined in claim 5 wherein the adjacent substrate is a wafer.

7. The process defined in claim 5 wherein the adjacent substrate is a second bar identical to the first bar.

8. A process for the fabrication of electromagnetic head assemblies from a wafer comprising rows of electromagnetic devices formed thereon, each row and the underlying portion of the wafer being a bar of head assembly units, which fabrication process comprises the steps of:

anchoring [the bar] *at least a portion of the wafer* to a fixture with a side surface *of a bar* exposed, *the wafer portion being thicker than the bar;* while the [bar] *wafer* is anchored, forming head assemblies along the side surface of the bar; and, severing the individual head assemblies from the wafer.

9. The process defined in claim 8 further comprising the steps of:

removing the wafer from the fixture after the severing step, anchoring the wafer to the fixture with a side surface of another bar exposed, while the bar is anchored, forming head assemblies along the side surface of the bar, severing the individual head assemblies from the wafer, and, repeating the foregoing steps until all bars in the wafer have been processed.

10. The process defined in claim 8 wherein the wafer is anchored to a fixture followed by its severance from the fixture to expose a side surface of the bar for chanical operations.

11. The prooess deemed in claim 10 further comprising the steps of:

anchoring the wafer to the fixture with a side surface of another bar exposed, and, repeating all the steps of claim 9 until all bars in the wafer have been processed.

12. A process for manufacturing electromagnetic head assemblies from a fabricated wafer which contains on one surface electromagnetic devices arranged in rows in identical orientation, said process comprising the steps of:

removing a part of the wafer to expose the surface on which the poles of the electromagnetic devices in a first row terminate, fastening the wafer to a fixture in such a manner so that the exposed surface is susceptible to mechanical processing, lapping and grinding the exposed surface so that a desired throat height of the poles and a desired contour of the row are attained, parting the processed row into individual head assemblies, and, removing the head assemblies from the remainder of the wafer by a slice cut, thereby generating a smaller wafer with an exposed surface on which the poles of the electromagnetic devices on a row adjacent to the first row terminate.

13. The process defined in claim 12 wherein the last three steps are repeated.

14. The process defined in claim 12 wherein the partial wafer is fastened to the future by bonding.

15. The process defined in claim 12 wherein the partial wafer is fastened to the fixture by clamping.

16. The process defined in claim 12 wherein the wafer is bonded to a lava substrate before it is fastened to the fixture via the lava substrate. and the lava substrate is debonded from the head assemblies formed as the last step of the process.

17. A process for manufacturing electromagnetic head assemblies from a fabricated wafer which contains on one surface electromagnetic devices arranged in rows in identical orientation. said process comprising the steps of:

removing a part of the wafer to expose the surface of one row, which surface being distal from the poles of the electromagnetic devices on the row;

fastening the wafer to a future via the exposed surface of the row, separating the remainder of the wafer from the row, thereby leaving exposed the surface of the row on which the poles terminate and generating a smaller wafer;

lapping and grinding the newly exposed surface of the row so that a desired throat height of the poles and a desired contour of the row are attained, parting the processed row into head assemblies, and, removing the head assemblies from the fixture.

18. The process defined in claim 17 wherein the fastening step and all steps subsequent thereto are repeated.

19. A process for manufacturing electromagnetic head assemblies from a fabricated wafer which contains on one surface electromagnetic devices arranged in rows, the electromagnetic devices on a given row being in one orientation while those on the adjacent row being in an opposite orientation, said process comprising the steps of:

slicing the wafer in such a manner to produce a plurality of identical double-row bars each having the poles of the electromagnetic devices on one row face those on the other row and further having two slice surfaces created by the slice, fastening one double-row bar onto a first fixture via a first slice surface and onto a second fixture via a second slice surface, separating the fastened double-row bar into two identical fastened single-row bars by a slice cut to expose the surfaces of the two single-row bars on which the poles exterminate, lapping and gnnding the exposed surface of the two single-row bar so that a desired throat height of the poles and a desired contour of the two single-row bars are attained, parting the two processed single-row bars into head assemblies, and, removing the head assemblies thus formed from the first and the second fixtures.

20. The process defined in claim 19 wherein there is a street between any two given adjacent rows of electromagnetic devices.

21. A process for manufactunng electromagnetic head assemblies from a fabricated wafer which contains on one surface electromagnetic devices arranged in rows, the electromagnetic devices on a given row being in one orientation while those on the adjacent row being in an opposite orientation, said process comprising the steps of:

slicing the wafer in such a manner to produce a plurality of identical double-row bars each comprising a first and a second single-row bars, the first singlerow bar having the poles of the electromagnetic devices thereon distal from those on the second single-row bar and each single-row bar having a slice surface created by the slice;

fastening one double-row bar onto a first fixture via the slice surface of the first single-row bar with the slice surface of the second single-row bar remaining exposed, lapping and grinding the exposed slice surface of the second single-row bar so that a desired throat height of the poles and a desired contour of the second single-row bar are attained, fastening the double-row bar onto a second fixture via the processed slice surface of the second singlerow bar, removing the first fixture from the processed second single-row bar, thereby exposing the slice surface of the first single-row bar;

lapping and grinding the newly exposed slice surface of the first single-row bar so that a desired throat height of the poles and a desired contour of the first single-row bar are attained.

transversely parting and longitudinally slicing the processed double-row bar into head assemblies, and, removing the head assemblies from the second fixture.

22. The process defined in claim 21 wherein there is a street between any two given adjacent rows of electromagnetic devices.

* * * * *